No. 752,526. PATENTED FEB. 16, 1904.
F. CURRAN.
TIRE GAGE.
APPLICATION FILED APR. 28, 1903.
NO MODEL.
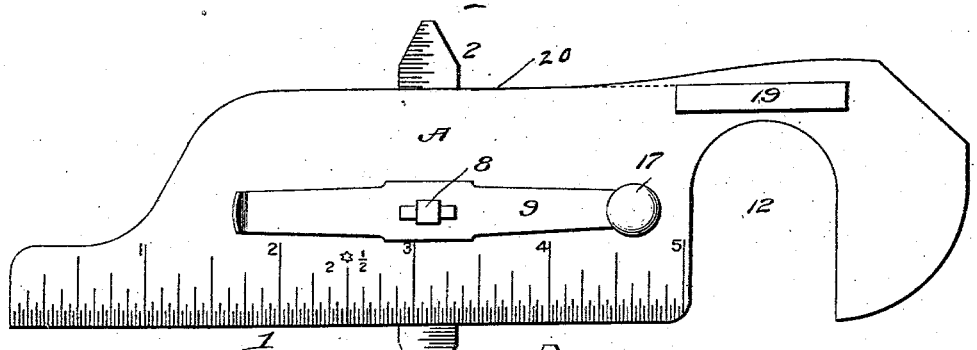
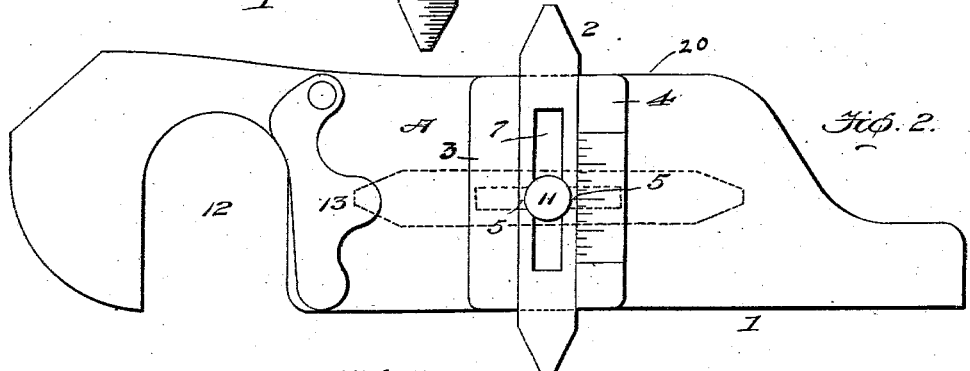
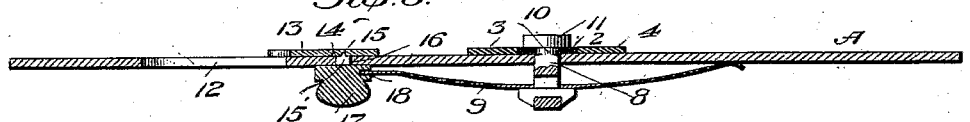
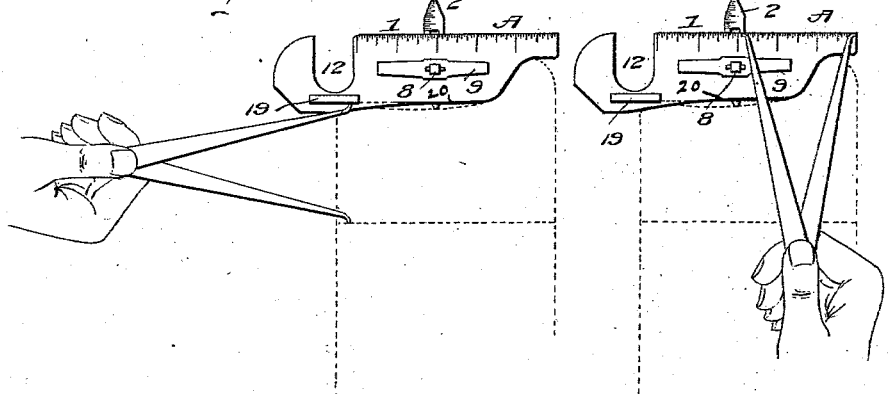
Witnesses
Inventor
Frank Curran No. 752,526. Patented February 16, 1904.

UNITED STATES PATENT OFFICE.

FRANK CURRAN, OF SUSQUEHANNA, PENNSYLVANIA.

TIRE-GAGE.

SPECIFICATION forming part of Letters Patent No. 752,526, dated February 16, 1904.

Application filed April 28, 1903. Serial No. 154,675. (No model.)

*To all whom it may concern:*

Be it known that I, FRANK CURRAN, a citizen of the United States, and a resident of Susquehanna, in the county of Susquehanna and State of Pennsylvania, have invented a new and useful Improvement in Tire-Gages, of which the following is a specification.

My invention relates to an improvement in tire-gages, and more particularly to that class of tire-gages illustrated in the Peter Curran patent, No. 440,621, granted November 18, 1890, its object being to retain all of the advantages of the Peter Curran construction with certain additional features of construction and combinations of parts, which will be hereinafter described, and pointed out in the claims.

In the accompanying drawings, Figures 1 and 2 are views in side elevation taken from opposite sides of my improved gage. Fig. 3 is a longitudinal sectional view, and Figs. 4 and 5 illustrate different applications of the gage to the wheel-tires for taking the thickness of the tire.

A represents the gage, stamped or otherwise pressed from sheet-steel with a contour substantially like that shown in the patent referred to and provided on the straight lower edge 1 with a five-inch scale divided into thirty-seconds of an inch, as the requirements of the railroads are that these measurements be given in thirty-seconds of an inch. On the opposite side from this scale a sliding finger 2 is confined between the guides 3 and 4, the latter of which has an inch-scale divided into sixteenths or other fractions of an inch, while the finger has a pointer 5 thereon to register with this scale. This finger is pointed at each end and provided on the inner surface with a scale divided in thirty-seconds of an inch, extending from each end inwardly for a distance of, say, three-quarters of an inch, and extending longitudinally through the center is a slot 7, through which the angular stud 8 passes, whereby to frictionally retain the finger wherever it is slid or adjusted, a plate-spring 9 being provided for creating the required friction upon the sliding finger. The stud extends through an angular aperture in the plate-spring and the gage proper, whereby it is permitted to slide, but prevented from turning, and in order to permit the finger to be turned parallel with the gage or out of the way when the latter is being carried in the pocket or elsewhere the stud is made cylindrical, as at 10, for a short distance, equivalent to the thickness of the finger immediately adjacent to the head 11 to afford a bearing for the finger to turn on, the stud being pushed out against the resistance of the spring to permit this turning when it is desired to throw the finger out of its groove between the guides.

There are a few cars now being used that have a wheel-flange that is ($\frac{1}{16}$) one-sixteenth of an inch thicker across the throat than those formerly constructed; but as the old and narrower style are more generally used I have adapted my gage for either, and for that purpose the recess 12 is made larger than formerly to fit the new style wheel-flanges mentioned above, and to reduce it back to the narrower and standard size I have provided a pivotal filler 13, which is pivoted adjacent to the inner edge of recess 12 and provided with two teeth or notches 14 and 15, adapted to be engaged by the dog 15', carried by the end of plate-spring 9, this dog being angular and sliding in a corresponding hole 16 and provided with a head 17, by which it is withdrawn for the adjustment of the filler, and also having an opening 18 in one side to receive the end of the spring by which it is actuated. Thus it will be seen that the spring 9 has a duplex function, one of holding the finger with suitable frictional contact in its guide-groove and the other wholly independent therefrom—namely, of actuating the dog to lock the filler in one of two positions, either out of the way when not required or in position to reduce the width of the recess 12, the two teeth or notches being provided for that purpose.

One other feature of this invention consists in the one-and-a-quarter-inch strip 19, located longitudinally of the gage just above the recess 12, and really constituting a continuation of its five-inch scale, with its outer edge in precise alinement with the edge 20 of the gage at the point where the finger crosses it. The special function of this strip will be seen by reference to Fig. 4, it being applied to the measurement of the tire thickness which is required by all railroads now every thirty days, and it is done by placing the gage on the wheel, as illustrated, and with either rule or calipers measuring down the side of the wheel, thus determining the thickness of the tire, not only on the outside, but also from the center of the tire, where the wheel treads the track and the finger 2 drops down to worn surface. This strip 19 is so located with reference to the irregular contour of the body portion of the gage that one of its sides is in alinement with the straight edge 20 of the gage and the edge 20 is parallel with the scaled edge 1. The strip extends or projects outward from the side of the body portion of the gage and preferably at right angles thereto, and it forms a longitudinally-offset continuation of the edge 20.

By graduating the finger 2 as shown and described on the opposite side of the gage from the sliding scale of one inch, which is in sixteenths, it will be seen that all of the rulings are on one side of the gage in thirty-seconds of an inch, as a special convenience in taking thicknesses of tires, and also it is a radical improvement over the old method in that the mechanic will not be required after making measurements as in the old way and getting them in sixteenths, of afterward reducing it to thirty-seconds, thus leaving it in that case with all measurements on one side of the gage.

It will be understood, of course, that there are many other applications of the gage beside those described. In fact, the entire contour of the gage is formed as it is for special purposes; but it is hardly necessary for my present purposes to go into the use of the article in all of its different positions.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. A tire-gage provided with a recess for the reception of the wheel-flange and means carried by the gage outside the recess to vary the width thereof, the means comprising a movable filler, and an automatically-actuated dog engaging the filler to retain it in its adjusted positions.

2. A tire-gage provided with a recess for the reception of the wheel-flange and means carried by the gage outside the recess to vary the width thereof, the means comprising a movable filler having openings therein, the gage provided with an aperture, one end of which is closed by the filler, a dog loosely received in the aperture in the gage, one end of the dog adapted to engage the openings in the filler and means for retaining the dog in position in any one of the openings in the gage.

3. A tire-gage provided with a recess for the reception of the wheel-flange and means carried by the gage outside the recess to vary the width thereof, the means comprising a filler pivotally secured to the gage and provided with openings the edge of the filler adjacent the recess being formed with a corresponding contour, the gage provided with an aperture, a dog loosely received in the aperture, one end of the dog adapted to enter any one of the openings in the filler to retain the latter in adjusted position and a spring engaging the dog to removably retain it in any of the openings of the filler.

4. A tire-gage comprising an irregularly-shaped body, portions of the opposite edges of the body being straight and parallel with each other and a projection extending outward from the body portion, and in alinement with one of the straight edges, the projection being longitudinally offset or removed from the straight edge with which it is in alinement.

5. A tire-gage comprising a body portion having an irregular contour and a projection extending outward transversely of the body portion and offset from the contour thereof, one face of the projection being in alinement with a portion of the contour of the body portion.

6. The combination with a gage, having a recess therein and a movable filler, of an adjustable finger, a pivot, a dog and a spring connected with and common to both the finger and the dog for retaining them yieldingly in place.

7. The combination with a gage, having a recess therein, and means for adjusting the side of this recess, and a dog for controlling said adjustment, of a finger, a stud having sliding connection with the gage, and pivotal connection with the stud, and a spring connected with the stud and dog for yieldingly retaining them in place.

8. A tire-gage comprising a body portion, a scale on one edge thereof, fixed guides carried by the body portion, a scale on one of the guides, a slotted finger received and sliding between the guides, a headed stud passing through the slot in the finger and through a non-circular aperture in the body portion, that portion of the stud opposite and inclosed by the finger being circular, the remainder of the stud being non-circular forming a shoulder, yielding means for holding the head of the stud in contact with the finger to retain the latter between the guides, the stud adapted to have a longitudinal movement, the shoulder of the stud adapted to engage the finger and force it out from between the guides, the finger adapted to rotate on the circular portion of the stud when the latter has been moved longitudinally.

9. A tire-gage comprising a body portion of irregular contour and a strip projecting outward from one side of the body portion, one face of the strip in alinement with a portion of the contour of the body portion and constituting a continuation thereof.

In testimony whereof I have signed this specification in the presence of two subscribing witnesses.

FRANK CURRAN.

Witnesses:
  B. T. GLIDDEN,
  HENRY C. MILLER.